United States Patent
Basilier et al.

(10) Patent No.: US 10,117,124 B2
(45) Date of Patent: Oct. 30, 2018

(54) METHOD, APPARATUS AND COMPUTER PROGRAM FOR UPDATING A PRIORITIZATION LEVEL OF A SERVICE DATA FLOW BASED ON TRAFFIC SIZE PER TIME UNIT OF SAID DATA FLOW

(71) Applicant: TELEFONAKTIEBOLAGET L M ERICSSON (PUBL), Stockholm (SE)

(72) Inventors: Henrik Basilier, Täby (SE); Per Willars, Vaxholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 78 days.

(21) Appl. No.: 14/892,423

(22) PCT Filed: May 28, 2013

(86) PCT No.: PCT/EP2013/060936
§ 371 (c)(1),
(2) Date: Nov. 19, 2015

(87) PCT Pub. No.: WO2014/191021
PCT Pub. Date: Dec. 4, 2014

(65) Prior Publication Data
US 2016/0135073 A1    May 12, 2016

(51) Int. Cl.
*H04W 28/02*    (2009.01)
*H04L 12/917*    (2013.01)
*H04L 12/851*    (2013.01)
*H04L 12/833*    (2013.01)
*H04L 12/801*    (2013.01)

(52) U.S. Cl.
CPC ..... *H04W 28/0263* (2013.01); *H04L 47/2433* (2013.01); *H04L 47/2458* (2013.01); *H04L 47/39* (2013.01); *H04L 47/76* (2013.01)

(58) Field of Classification Search
CPC .......... H04W 28/0263; H04L 47/2458; H04L 47/39; H04L 47/2433; H04L 47/76
See application file for complete search history.

(56) References Cited

U.S. PATENT DOCUMENTS 6,738,368 B1 * 5/2004 Terry .................. H04L 12/5602
370/229
2007/0153682 A1    7/2007 Swenson et al.
(Continued)

FOREIGN PATENT DOCUMENTS

WO    0062504 A1    10/2000
WO    2007087828 A1    8/2007

*Primary Examiner* — Min Jung

(57) ABSTRACT

This disclosure relates to a method, and an arrangement and a computer program for updating a prioritization level of a service data flow between a user node and a network node. The method comprises obtaining a traffic size per time unit of detected data packets of the service data flow, and updating the prioritization level of the service data flow, based on the obtained traffic size per time unit. It is an advantage that embodiments provide a possibility to determine a trade-off between the need to optimize response times for short-lived data sessions and limiting the impact on other users when prioritizing long-lived high volume sessions. It is advantageous that the embodiments are applicable to situations in which a direct classification, using IP 5-tuple or deep packet inspection is not meaningful.

15 Claims, 5 Drawing Sheets

(56) References Cited

U.S. PATENT DOCUMENTS

| | | | |
|---|---|---|---|
| 2011/0261831 A1* | 10/2011 | Sharma | H04L 47/17 370/412 |
| 2013/0279340 A1* | 10/2013 | Nakash | H04L 47/2483 370/237 |
| 2013/0308446 A1* | 11/2013 | Muto | H04W 76/36 370/230 |
| 2014/0348080 A1* | 11/2014 | Griot | H04W 28/0263 370/329 |

* cited by examiner

METHOD, APPARATUS AND COMPUTER PROGRAM FOR UPDATING A PRIORITIZATION LEVEL OF A SERVICE DATA FLOW BASED ON TRAFFIC SIZE PER TIME UNIT OF SAID DATA FLOW

This application is a 371 of International Application No. PCT/EP2013/060936, filed May 28, 2013, the disclosure of which is fully incorporated herein by reference.

TECHNICAL FIELD

This disclosure relates to a method, an arrangement and a computer program for updating a prioritization level of a service data flow between a user node and network node during a user application session.

BACKGROUND

A service data flow is normally identified by techniques such as Internet Protocol 5-tuple inspection or by using Deep Packet Inspection based on e.g. Uniform Resource Location inspection. Methods for assigning a priority level or Quality of Service for such service data flows are well known. For instance, in $3^{rd}$ Generation Partnership Project networks, a service data flow can be associated with a, so called, dedicated bearer, to which all traffic belonging to the service data flow is mapped. Identification of service data flows can also be used to trigger upgrades of the priority of an existing bearer or data channel. This is all well known.

Common to these two cases is that an appropriate priority level typically has to be associated with the dedicated or upgraded bearer. The priority level may for instance be implemented by using a "scheduling weight" or similar priority parameter in the scheduler in the base stations of mobile broadband networks.

Whereas a high priority or aggressive scheduling weight provides the best effect of prioritization, it also has the highest impact on traffic of other users in the cell.

For short-lived service data flows, where a short response time for a user is desirable, a high priority may be acceptable. This is due to that the volume of the data being aggregated by the service data flow is also low and therefore the impact on the performance of traffic from other users in the system is negligible.

For long-lived service data flows having a large data volume being transmitted, such as when downloading large data files, the benefits of a high priority are less emphasized, as only a moderate priority level increase will give a significant improvement in the download time. Transferring large data volumes using a high priority can have considerable negative impact on the performance of other. Therefore, for large data volumes, the usage of a moderate priority level is often more desirable, where the moderate priority level is lower than a "high" priority level, but however still higher than a default priority level.

To make a right choice, i.e. what level of prioritization to use for a service data flow, the service data flow has to be characterized to some extent. In many cases the identification techniques as described above, IP 5-tuple and Deep Packet Inspection, are fully adequate and sufficient for this characterization.

However, there are conditions at which the aforementioned techniques are not sufficient and that is when multiple service data flows are multiplexed into a single service data flow one, which makes the original service data flows indistinguishable from each other.

One example is optimization client/proxy multiplexing of service data flows into a single compressed data stream, for which to intermediate systems the service data flows will appear as a single service data flow. Another example is Virtual Private Network tunnels, e.g. clients connecting to enterprise networks using Secure Sockets Layer or IP Security Virtual Private Networks. Other examples are long-lived secure Hyper Text Transfer Protocol sessions which support interactivity with the clients, as well as SPDY protocol sessions over Secure Sockets Layer/Transport Layer Security.

A characterization of a multiplexed service data flow would only detect a single service data flow. This service data flow would then comprise several micro flows, potentially with very different characteristics. These micro flows are however not easily identifiable using conventional methods.

Common to these cases is that it is now intrinsically difficult to characterize the service data flow such that an appropriate prioritization level can be chosen. To mitigate the cost penalties that would arise from choosing too high a priority level, a more moderate priority level will likely have to be chosen. However, the result of a more moderate priority level is that the short lived micro flows will not benefit from the higher priority level that they would otherwise have received.

As a measure to adopt a priority level a leaky bucket-type algorithm has been used in quality of service contexts. According to the typical use however is to perform actions on non-conformant data traffic, e.g. any data traffic exceeding say 100 kbps will be sent at a lower priority, or even be dropped.

There is thus a need for an alternative approach by which a prioritization level can be successfully determined for a service data flow having unknown characteristics.

SUMMARY

It is an object of example embodiments of the invention to address at least some of the issues outlined above. This object and others are achieved by the method, the arrangement and the computer program according to the appended independent claims, and by the embodiments according to the appended dependent claims.

A first example embodiment provides a method for updating a prioritization level of a service data flow between a user node and a network node of a communication system, for which the network node further is connected to an application server participating in the service data flow. The method is performed in an arrangement of the communication system, and has access to the service data flow. The method comprises obtaining a traffic size per time unit of detected data packets of the service data flow; and updating the prioritization level of the service data flow, based on the obtained traffic size per time unit.

A second example embodiment provides an arrangement for updating a prioritization level of a service data flow between a user node and a network node of a communication system, where the arrangement is configured to have access to the service data flow. The arrangement comprises a processor, and a memory configured to store a computer program comprising computer program code which, when run in the processor, causes the arrangement to obtain a traffic size per time unit of the service data flow; and update the prioritization level of the service data flow based on the obtained traffic size per time unit.

A third example embodiment provides a computer program for updating a prioritization level of a service data flow between a user node and a network node of a communication system. The computer program comprises computer program code which, when run in a processor of an arrangement that has access to the service data flow, causes the arrangement to obtain a traffic size per time unit of the service data flow; and update the prioritization level of the service data flow based on the obtained traffic size per time unit.

Embodiments of the present invention provide an advantage in that they provide a possibility to determine a trade-off between the need to optimize response times for short-lived sessions and limiting the impact on other users when prioritizing long lived high volume sessions.

Another advantage is that the embodiments are applicable to situations in which a direct classification, using IP 5-tuple or deep packet inspection is not meaningful.

BRIEF DESCRIPTION OF THE DRAWINGS

Example embodiments will now be described in more detail, and with reference to the accompanying drawings, in which.

DETAILED DESCRIPTION

In the following description, different example embodiments of the invention will be described in more detail, with reference to accompanying drawings. For the purpose of explanation and not limitation, specific details are set forth, such as particular scenarios and techniques in order to provide a thorough understanding.

There is hence a need for an alternative approach by which a prioritization level can be successfully determined for a service data flow comprising sub-flows having unknown characteristics.

Embodiments of present invention relate to determining a prioritization level for a service data flow. The determining of the prioritization level is further based on the size of data packets of the service data flow. Since the size of the data packets of the service data flow typically changes dynamically, embodiments are directed to determining a prioritization level for a service data flow dynamically.

Embodiments of the present invention are directed to adopting a prioritization level based on characteristics of micro flows of the service data flow, by using data size or data volume of transactions of the service data flow as a measure. This measure is determined per time unit as will be described in more detail down below.

Determining a prioritization level based on data size or data volume is in contrast to traditional techniques as mentioned above where 5-tuple inspection or Deep Packet Inspection can be used.

It should be emphasized that embodiments herein are especially applicable where traditional techniques for characterization of a service data flow cannot be used.

Figure 1:
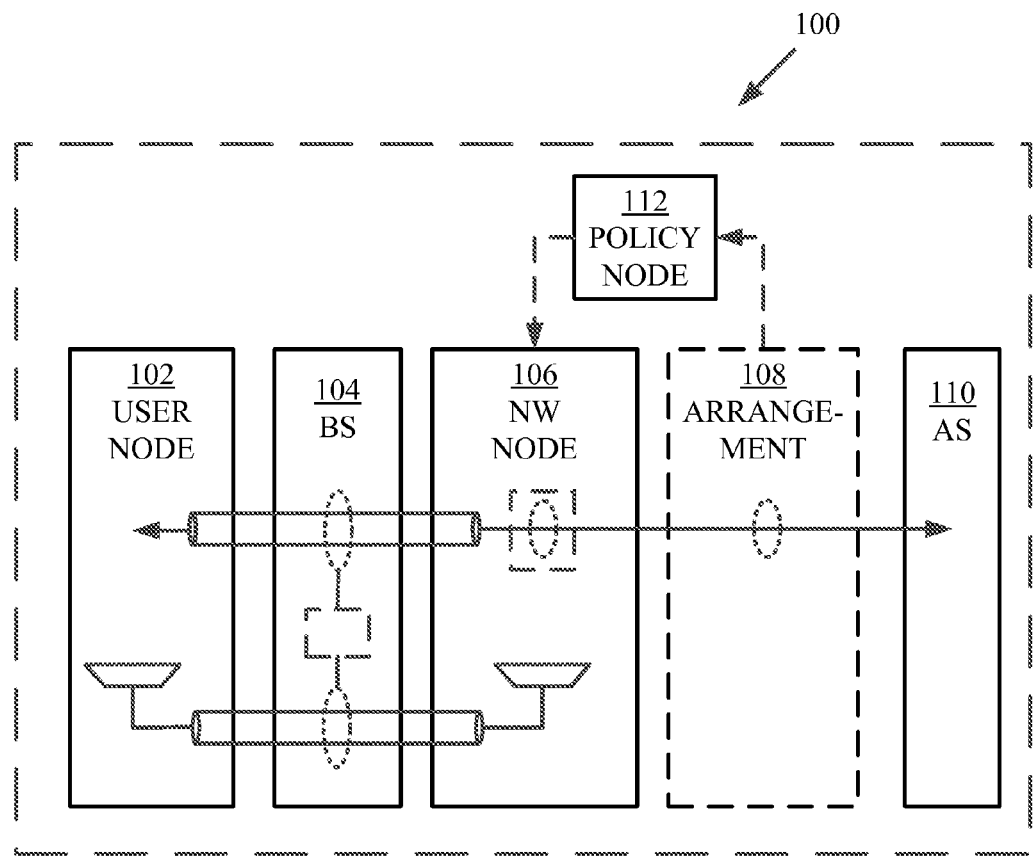
FIG. 1 presents a communication network related to embodiments of the invention.

FIG. 1 provides a schematic presentation of a communication network 100 related to a few embodiments of this invention. The network comprises a user node 102, a base station 104, a network node 106, an arrangement 108, an application server 110, and a policy node 112. A network connection is established between the user node 102 and the network node 106 for carrying the service data flow involving the application server 110.

According to some embodiments, the arrangement 108 is configured to determine a prioritization level. A request for a quality of service (QoS) corresponding to the prioritization level is directed to the policy node 112, from which a QoS instruction is sent to the network node 106. Based on the QoS instruction the network node upgrades an existing bearer or establishes a new dedicated bearer, corresponding to the QoS of the instruction.

Other embodiments of how an update of a prioritization level can be applied to a service data flow will be described down below.

Figure 2:
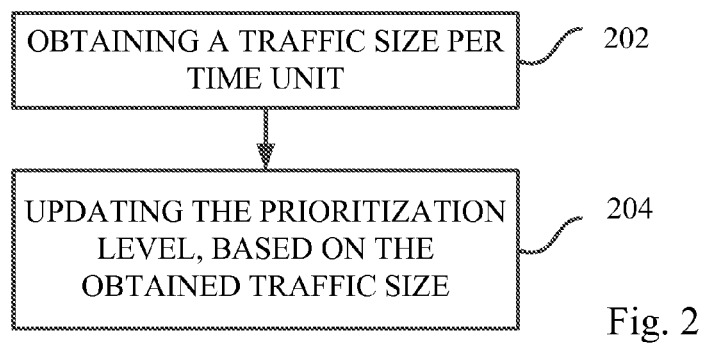
FIG. 2 is a flowchart illustrating embodiments of the invention.

FIG. 2 presents a flowchart of a general method for updating a prioritization level of a service data flow between a user node 102 and a network node 106 of a communication system, wherein the network node further is connected to an application server 110 that participates in the service data flow. The method is performed in an arrangement 108 of the communication system, wherein the arrangement has access to the service data flow. The method comprises obtaining 202 a traffic size per time unit of detected data packets of the service data flow; and updating 204 the prioritization level of the service data flow, based on the obtained traffic size per time unit.

A prioritization level update can be effectuated by upgrading/downgrading a QoS of a bearer of the service data flow or by using dedicated bearers for the service data flow.

According to some embodiments of the present invention, the method for updating a prioritization level of a service data flow, further comprises:

adding virtual tokens to a virtual leaky bucket based on the obtained traffic size per time unit of the service data flow, and withdrawing virtual tokens from the virtual leaky bucket according to a leakage rate of the virtual leaky bucket;

wherein updating 204 the prioritization level of the service data flow comprises:

downgrading the prioritization level if a fill level of virtual tokens in the virtual leaky bucket increases to a first downgrade threshold; or upgrading the prioritization level, if the fill level of virtual tokens in the virtual leaky bucket decreases to a pending threshold and no data packets have been detected during a pre-determined time interval, or if the fill level of virtual tokens in the virtual leaky bucket decreases to a first upgrade threshold.

Updating the prioritization level of the service data flow of the method may comprise further upgrading the prioritization level from an already upgraded prioritization level, if the fill level of virtual tokens in the virtual leaky bucket decreases to a second upgrade threshold.

Updating the prioritization level of the service data flow of the method may comprise further downgrading the prioritization level from an already downgraded prioritization level, if the fill level of virtual tokens in the virtual leaky bucket increases to a second downgrade threshold.

It should be pointed out that actions that are triggered when a fill level reaches a fill level threshold not only affect non-conformant traffic, but in fact affect the entire service data flow.

The leakage rate as mentioned above can be set such that interactive sessions or micro flows are not likely to increase the fill level of the virtual bucket to a downgrade threshold, for which reason it will be sent using high prioritization level. Longer sessions, such as file downloads on the other hand, will be likely to increase the fill level of the virtual bucket and eventually reach a downgrade threshold at the prioritization level is downgraded.

When the virtual leaky bucket is being emptied such that fill level of the virtual leaky bucket reaches an upgrade threshold, an upgrade of the prioritization level is performed. The upgrade threshold is positioned at a lower fill level than the downgrade threshold, creating some hysteresis in order to avoid a back-and-forth prioritization level change effect, a so called ping-pong effect.

Figure 3:
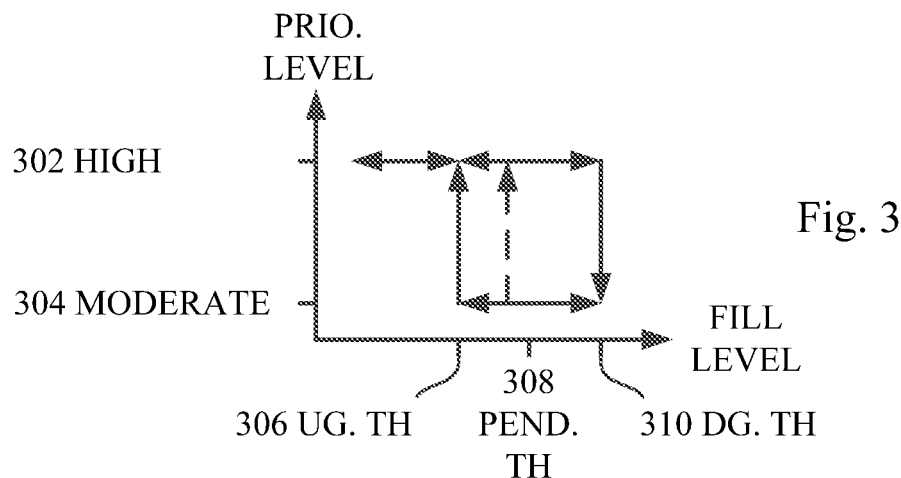
FIGS. 3 and 4 illustrate examples of prioritization level pathways of embodiments of the invention.

FIG. 3 illustrates an example of a prioritization level pathway when dynamically determining a prioritization level dynamically.

This figure can be applied to the embodiments in which a modified leaky bucket is used for determining a prioritization level update. As mentioned above the leaky bucket is added with virtual tokens based on the size of the traffic of the service data flow. A number of tokens are also withdrawn from the leaky bucket based on a predetermined leakage rate.

If for instance the prioritization level is moderate, the virtual fill level of the virtual leaky bucket will at some time decrease to an upgrade threshold 306, at which the prioritization level is upgraded from a moderate prioritization level 304 to a high prioritization level 302.

It is mentioned that the fill level cannot increase beyond the downgrade threshold if there is one downgrade threshold, or beyond the highest downgrade threshold if there are multiple downgrade thresholds. The downgrade or highest downgrade threshold corresponds to a completely full virtual leaky bucket. Any virtual tokens added to an already completely full virtual leaky bucket will simple overflow the filled virtual leaky bucket and hence not further increase the fill level of the virtual leaky bucket.

The high prioritization level 302 is maintained for low and moderate fill levels of the virtual leaky bucket. If the fill level increases to a downgrade threshold 310, the prioritization level is decreased from the high prioritization level 302 to the moderate prioritization level 304.

Moreover, if the prioritization level is moderate 304 and the fill level decreases to or beyond a pending threshold 308, but not until the upgrade threshold 306, and no data packets are detected during a pre-determined time period, the prioritization level may be upgraded from the moderate prioritization level 304 to the high prioritization level 302.

In FIG. 3 two thresholds for upgrade were thus used. When the pending threshold 308 is reached, an upgrade is performed if no data packets are detected during a pre-determined time period. This can be used to ensure that an upgrade is performed as soon as possible when a micro flow, for instance a download, ends, and before the next micro flow starts. The next micro flow could very well be short-lived and therefore benefit from a higher prioritization level.

The lower level upgrade threshold 306 can be used to ensure that the downgraded level is not kept for indefinite time, e.g. if there is background traffic, that cause the pending threshold 308 to have no effect, but the bucket fill level will eventually reach the upgrade threshold 306.

It must be added that the fill level of virtual tokens in the virtual leaky bucket can change dynamically, since the fill level is based on the traffic size of data packets of the service data flow. The horizontal arrows of the prioritization level path of FIG. 3 therefore have a head at each end of the arrows. A downgrade or upgrade of a prioritization level can however only be performed in the direction as indicated by the vertical arrows of the prioritization level pathway.

For example, at a medium high prioritization level 404, the prioritization level is upgraded to a high prioritization level 402, if the fill level decreases to the upgrade threshold (UG TH2) 408. If the fill level increases to a downgrade threshold (DG TH2) 414 while residing at a medium high prioritization level 404, the prioritization level is downgraded to a moderate prioritization level 406. While residing at the medium high prioritization level 404, no updating of the prioritization level will be performed when reaching either one of the upgrading threshold (UG TH1) 410 or the downgrading threshold (DG TH1) 412. In FIG. 3, the prioritization level is upgraded or downgraded between two prioritization levels, high 302 and moderate 304.

Several prioritization levels are also envisaged. For example, the prioritization level for service data flow may be updated by upgrading from a first prioritization level to a second prioritization. Thereafter, upgrading may be performed from the second prioritization level to third prioritization, and possibly further to even higher prioritization levels.

Figure 4:
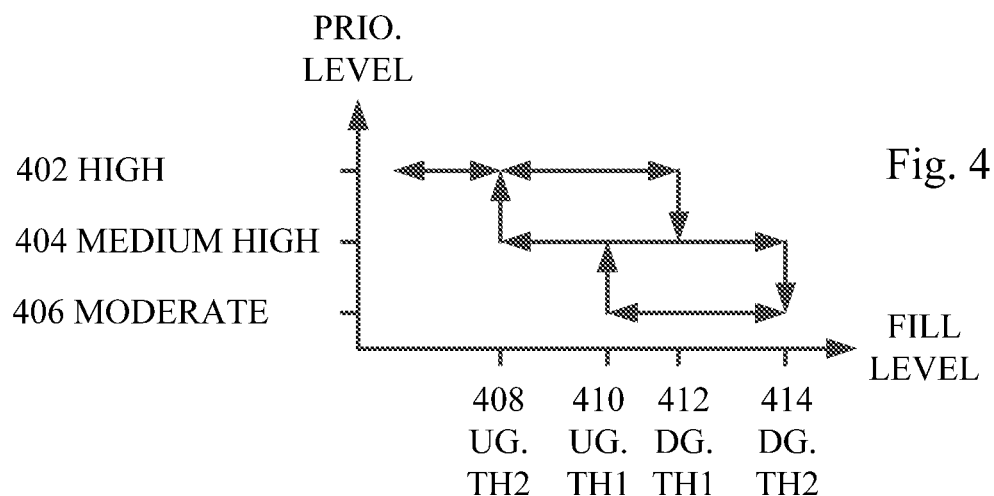

FIG. 4 illustrates an example of a prioritization level pathway involving multiple prioritization levels between which the prioritization level for a service data flow is changed.

Similar to FIG. 3, if for instance the prioritization level is moderate 406, the virtual fill level of the virtual leaky bucket will at some time decrease to a first upgrade threshold, 410 at which the prioritization level is upgraded from a moderate prioritization level 406 to a medium high prioritization level 404. While being at the medium high prioritization level 404 and the fill level decreases to a second upgrade threshold 408, the prioritization level is upgraded from the medium high prioritization level 404 to a high prioritization level 402.

The high prioritization level 402 can be maintained for moderate and medium high fill levels of the virtual leaky bucket. If the fill level increases to a first downgrade threshold 412, the prioritization level is decreased from the high prioritization level 402 to the medium high prioritization level 404. If the fill level further increases to a second downgrade threshold 414, the prioritization level is decreased from the medium high prioritization level 404 to the moderate prioritization level 406.

Needless to say, the number of prioritization levels may be increased further beyond three.

The method may further comprise determining a quality of service, QoS, for the service data flow, wherein the QoS corresponds to the updated prioritization level.

The method may further comprise sending a request for the determined QoS to a policy node, for enabling the network node to allocate a bearer for the service data flow, the bearer being associated with the determined QoS requested.

The method may further comprise signaling a QoS update to a base station serving the user node, for enabling the base station to allocate a bearer for the service data flow, the bearer being associated with the determined QoS requested.

The method may further comprise allocating a bearer for the service data flow, the bearer being associated with the determined QoS requested.

As will be mentioned down below, allocation of the bearer, can be performed by modifying an already existing bearer for the determined QoS, or by allocating a dedicated bearer for the determined QoS.

The method may further comprise scheduling transmission of data of the service data flow according to the prioritization level update.

Moreover, obtaining the traffic size per time unit of the method may further comprise measuring a size of data packets of the service data flow per time unit.

Figure 5:
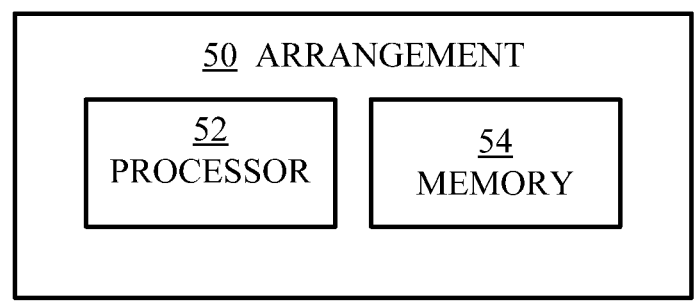
FIG. 5 is a block diagram illustrating embodiments of the invention.

FIG. 5 presents a block diagram of an arrangement 108, 50 for updating a prioritization level of a service data flow between a user node 102 and a network node 106 of a communication system, where the arrangement 108 is configured to have access to the service data flow, and comprises:
  a processor 52; and
  a memory 54 storing a computer program comprising computer program code which, when run in the processor, causes the arrangement to:
    obtain 202 a traffic size per time unit of the service data flow; and
    update 204 the prioritization level of the service data flow based on the obtained traffic size per time unit.

According to some embodiments of the present invention, the computer program code which, when run in the processor 52, further causes the arrangement 50, 108 to obtain a fill level of virtual tokens in a virtual leaky bucket; to add virtual tokens to the virtual leaky bucket based on the obtained traffic size per time unit of the data traffic flow, and withdraw virtual tokens from the virtual leaky bucket according to a leakage rate of the virtual leaky bucket; to downgrade a prioritization level if the fill level of virtual tokens in the virtual leaky bucket increases to a first downgrade threshold 310, 412; and to upgrade the prioritization level, if the fill level of virtual tokens in the virtual leaky bucket decreases to a pending threshold 308 and no data packets have been detected during a pre-determined time interval, or if the fill level of virtual tokens in the virtual leaky bucket decreases to a first upgrade threshold 306, 410.

The computer program code which, when run in the processor 52, may further cause the arrangement 50, 108 to further upgrade the prioritization level from an already upgraded prioritization level, if the fill level of virtual tokens in the virtual leaky bucket decreases to a second upgrade threshold 408.

The computer program code which, when run in the processor 52, further causes the arrangement 50, 108 to further downgrade the prioritization level from an already downgraded prioritization level, if the fill level of virtual tokens in the virtual leaky bucket increases to a second downgrade threshold 414.

The arrangement 108, 50 may be comprised within a packet inspection node, the network node 106 for the service data flow, a base station or a radio network controller 104, serving the user node 102.

The arrangement may also be implemented in a stand-alone device or as a virtual machine.

Embodiments of the present invention also comprise a computer program for updating a prioritization level of a service data flow between a user node 102 and a network node 106. The computer program comprises computer program code which, when run in a processor of an arrangement having access to the service data flow, causes the arrangement to:
  obtain 202 a traffic size per time unit of the service data flow; and
  update 204 the prioritization level of the service data flow based on the obtained traffic size per time unit.

FIGS. 6 to 9 presenting signaling diagrams will in the following be presented to illustrate different applications of embodiments of the present invention.

Figure 6:
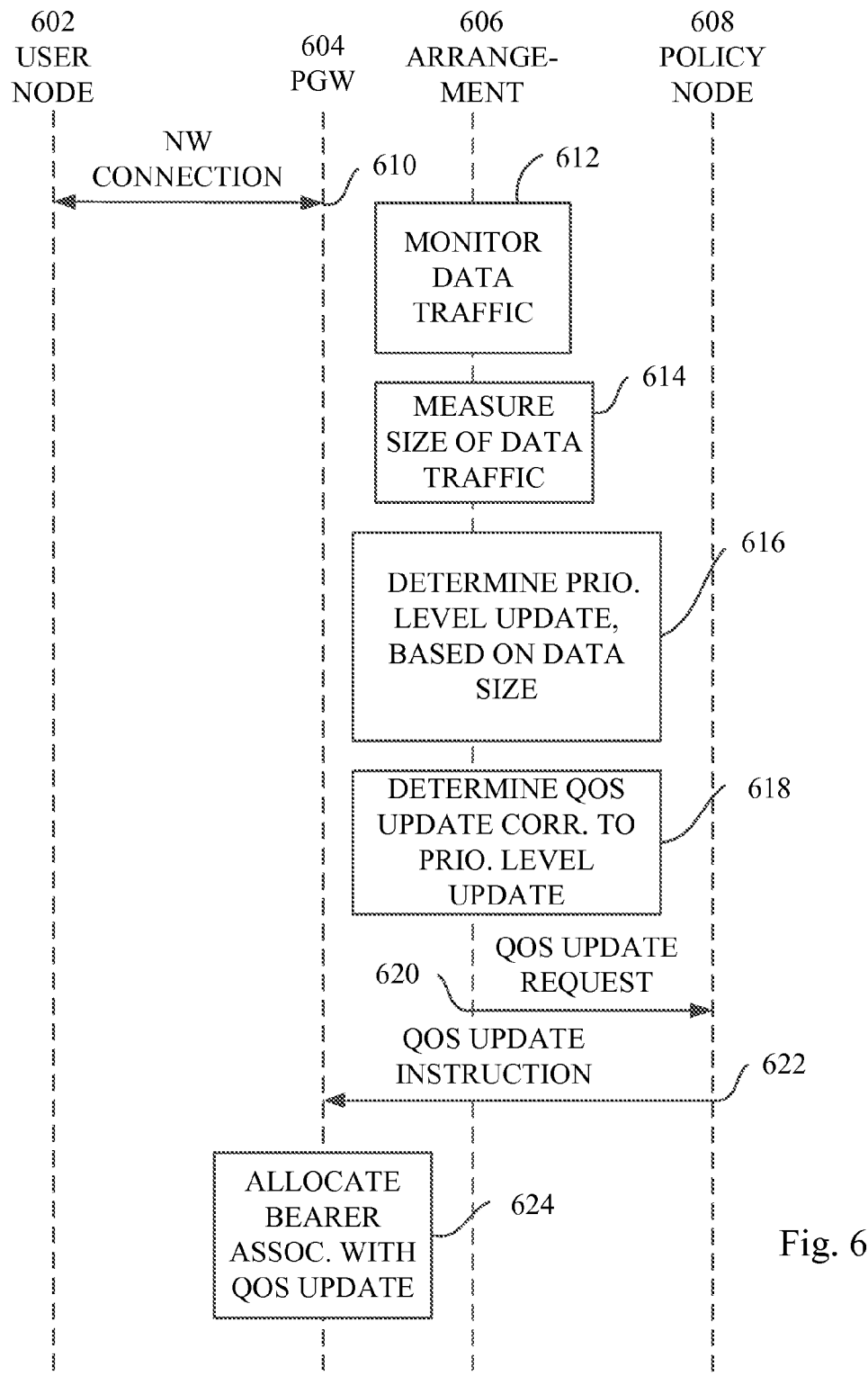
FIGS. 6 to 9 are signalling diagrams schematically illustrating embodiments of the invention.

FIG. 6 presents a signaling diagram of example signaling according to some embodiments of the invention, wherein signaling is performed between a user node 602, a packet gateway (PGW) 604, an arrangement 606 and a policy node 608.

In 610 a network connection is established between the user node 602 and the packet gateway 604. The network connection carries a service data flow which comprises sub-flows which traffic that cannot be individually characterized by using a 5-tuple or deep packet inspection. For instance the network connection may be encrypted, such as for a VPN tunnel.

In 612 the arrangement 606 having access to the service data flow monitors the data traffic of the service data flow. In 614 the arrangement measures the size of detected data packets per time unit.

In 616 the arrangement 606 determines a prioritization level update, based on the measured data size of the service data flow.

In 618 the arrangement 606 determines a QoS update that is correlated to the prioritization level update, from 616.

Having determined the QoS update, a QoS update request 620 is sent to the policy node 608. In 622 a QoS update instruction, as a response to the QoS update request, is sent from the policy node 608 to the packet gateway 604.

In 624, this packet gateway 624 allocates a bearer that is associated with the QoS update, for the service data flow. Allocation of the bearer in 624, can be performed by modifying an already existing bearer for the determined QoS, or by allocating a dedicated bearer for the determined QoS.

In the signaling diagram of FIG. 6, a prioritization level update is determined by the arrangement 606, for which a QoS is determined. A bearer associated with the QoS update is then allocated to the service data flow in the packet gateway 604.

Figure 7:
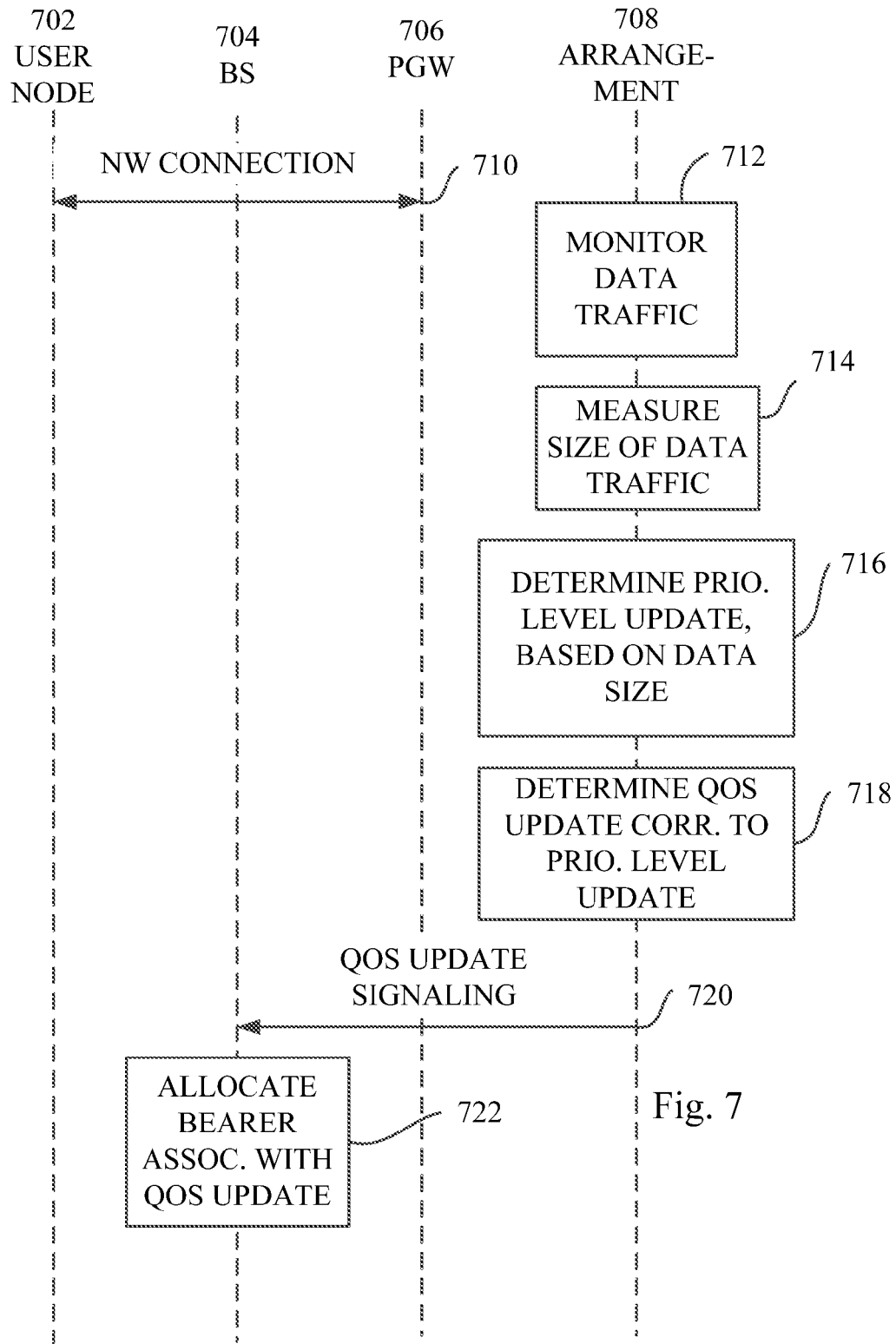

FIG. 7 presents another signaling diagram of example signaling according to embodiments of the invention, wherein signaling is performed between a user node 702, a base station or a radio network controller 704, a packet gateway (PGW) 706, and an arrangement 708.

In 710 a network connection is established between the user node 702 and the packet gateway 706. The network connection again carries a service data flow which comprises sub-flows which traffic that cannot be individually characterized by using a 5-tuple or deep packet inspection. The network connection may be encrypted, such as for a VPN tunnel.

In 712 the arrangement 708 having access to the service data flow monitors the data traffic of the service data flow. In 714 the arrangement measures the size of detected data packets per time unit.

In 716 the arrangement 708 determines a prioritization level update, based on the measured data size of the service data flow.

In 718 the arrangement 708 determines a QoS update that is correlated to the prioritization level update, from 716.

In 720, a QoS update signaling is sent to the base station or the radio network controller, instructing the base station or radio network controller about the determined QoS update.

In 722 the base station or the radio network controller allocates a bearer that is associated with the QoS update, for the service data flow.

In the signaling diagram of FIG. 7, a prioritization level update is determined by the arrangement 708, for which a QoS is determined. A bearer associated with the QoS update is then allocated to the service data flow by the base station or radio network controller 704.

Figure 8:
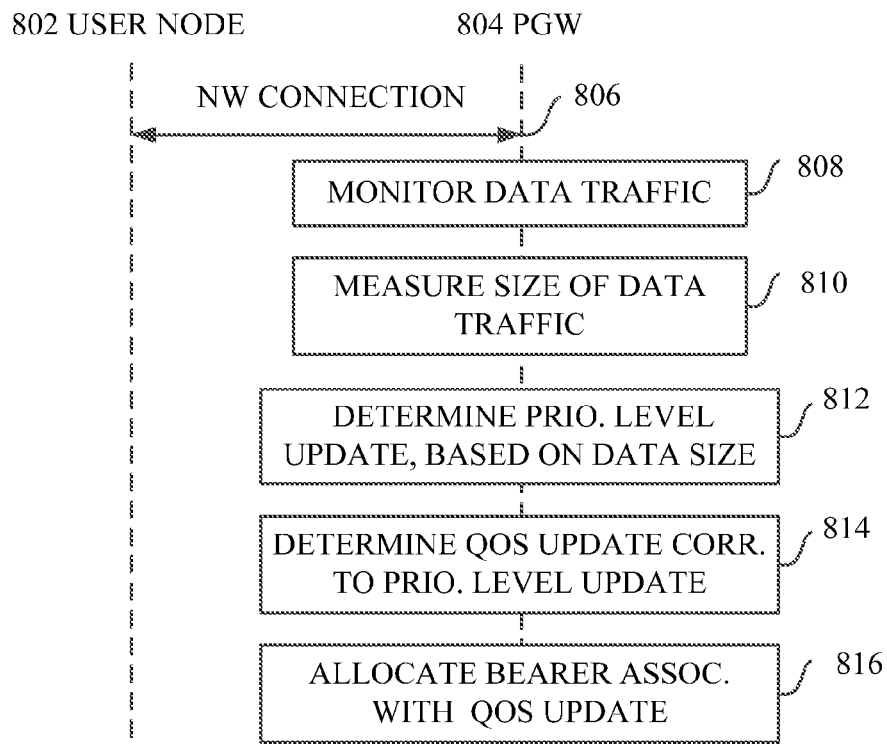

FIG. 8 presents yet another signaling diagram of example signaling according to embodiments of the invention, wherein signaling is performed between a user node 802 and a packet gateway (PGW) 804. Within this example the packet gateway 804 typically comprises an arrangement 50, 108.

In 806 a network connection is established between the user node 802 and the packet gateway (PGW) 804. The network connection again carries a service data flow comprising sub-flows which cannot be individually characterized by using a 5-tuple or deep packet inspection.

In 808 the PGW 804 having access to the service data flow monitors the data traffic of the service data flow. In 810 the PGW 804 measures the size of detected data packets per time unit.

In 812, the PGW 804 determines a prioritization level update, based on the measured data size of the service data flow.

In 814, the PGW 804 determines a QoS update that is correlated to the prioritization level update, from 812.

In 816, the PGW 804 allocates a bearer that is associated with the QoS update, for the service data flow.

Allocation of the bearer in 816, can be performed by modifying an already existing bearer for the determined QoS, or by allocating a dedicated bearer for the determined QoS.

In the signaling diagram of FIG. 8, a prioritization level update is determined by the PGW 804, for which a QoS is determined. A bearer associated with the QoS update is then allocated to the service data flow by the PGW 804.

Figure 9:
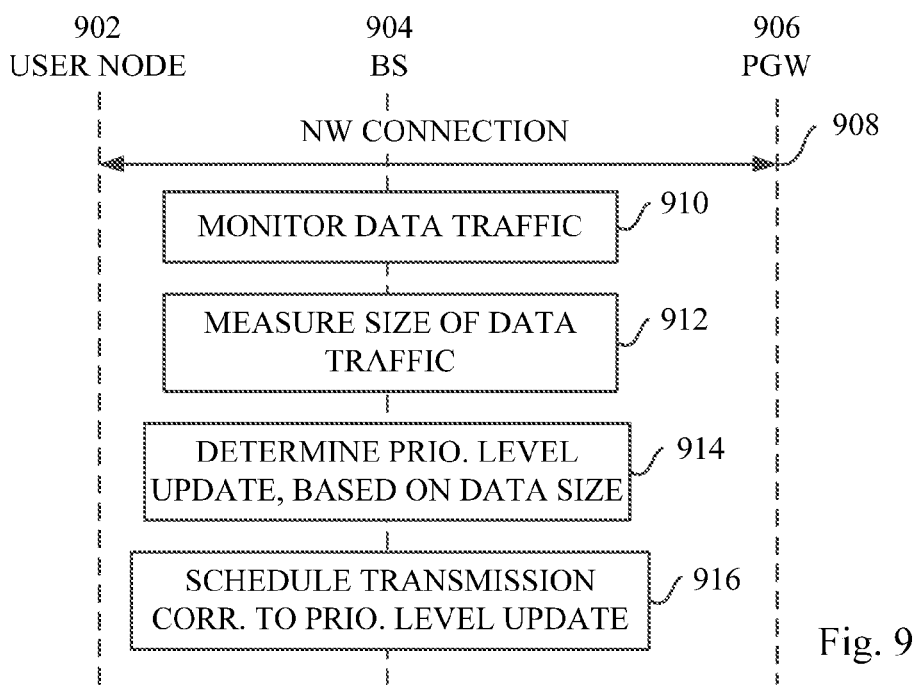

FIG. 9 presents still yet another signaling diagram of example signaling according to embodiments of the invention, wherein signaling is performed between a user node 902, a base station or a radio network controller 904, and a PGW 906. Within this example the base station or radio network controller 904 typically comprises an arrangement 50, 108.

In 908 a network connection is established between the user node 902 and the base station or radio network controller 904. The network connection again carries a service data flow comprising sub-flows which cannot be individually characterized by using a 5-tuple or deep packet inspection.

In 910 the base station or radio network controller 904 having access to the service data flow monitors the data traffic of the service data flow.

In 912 the base station or radio network controller 904 measures the size of detected data packets per time unit.

In 914, the base station or radio network controller 904 determines a prioritization level update, based on the measured data size of the service data flow.

In 916, the base station or radio network controller 904 schedules transmission of data of the service data flow according to the prioritization level update, from 914.

In the signaling diagram of FIG. 9, a prioritization level update is determined by the base station or radio network controller 904. Transmission is scheduled by the base station or radio network controller 904, where the transmission is scheduled according to the determined prioritization level update.

The base station can update the prioritization level for data of the service data flow that arrive on a particular bearer.

It should be mentioned that the base station or network controller 904 may alternatively determine a QoS update that is correlated to the prioritization level, from 914, after which it allocates a bearer that is associated with the QoS update, for the service data flow.

Embodiments herein can be applied to the usage of one or more dedicated bearers as well as to a common or default bearer that is upgraded or downgraded, to mention a few examples only.

The QoS of a dedicated bearer can be modified by upgrading or downgrading a prioritization level of the dedicated bearer. Yet alternatively, the dedicated bearer can be released and re-established with a modified QoS, corresponding to upgrading or downgrading of the prioritization level.

In the case of dedicated bearers, two dedicated bearers can for example be used, one with high priority corresponding to the high prioritization level and another with a lower, e.g. a moderate priority, corresponding to a lower prioritization level.

A network connection for the service data flow may be set up to normally use a bearer with a high priority. In a situation where the traffic size of the service data flow exceeds a downgrade threshold, the traffic is direct or mapped to the bearer with a priority lower than the high priority. If the data volume per time unit decreases below an upgrade threshold, the traffic is once again directed to the bearer with the high priority.

Dynamically redirecting or mapping traffic may be performed by using differentiated services code point (DSCP) mapping of data packets of the service data flow, and configure traffic filters within for instance PGW or a Gateway General Packet Radio Service Support Node mapping packets to bearer, based on to use the DSCPs.

Configuring traffic filters in a PGW using DSCPs may alternatively be performed based on the QoS instruction 622 as sent by the policy node 608, for mapping or directing traffic to various bearers, where each filter typically can corresponds to one DSCP value.

By redirecting traffic using the DSCPs, traffic belonging to high volume micro flows will to a large extent be directed to a bearer having moderate priority, whereas short-lived micro flows will to a largely be directed to a bearer having a high priority.

If upgrade or downgrade of bearers is used, instead of dedicated bearer, the leaky bucket thresholds can instead be used to trigger downgrading, via a downgrade threshold, and upgrading, via an upgrade threshold, of the bearer used for the service data flow.

Upgrade and downgrades of the bearer can alternatively be tied to other criteria as well. For instance, reaching of an upgrade threshold may not always result in a triggering of an immediate upgrade, but it could rather be treated as a required criterion for allowing the upgrade which in itself could be triggered by some other event. A prioritization level related state, eligible for upgrade may thus be used.

As a prioritization level is determined by for instance upgrading or downgrading the QoS, both the uplink as well as the downlink is affected. Data traffic in uplink as well as in downlink will hence be affected by any update of the prioritization level of the network connection. This is due to that the bearer, which is allocated resources by the adaptation of the QoS carries data traffic in both uplink and downlink.

It can furthermore be shown that determined prioritization level can largely be correlated with the characteristics of the micro flows of the service data flow.

For embodiments using the leaky bucket, when a long-lived micro flow starts, there is a delay before downgrading is triggered since filling the leaky bucket to a downgrade threshold takes some time.

It can be noted that this time delay will be shorter the higher the bitrate is of the micro flow. The threshold must however be set high enough in order not to penalize the short lived micro flows.

Similarly, there is a time delay from an end of a micro flow to when an upgrade is allowed or determined. If there is no traffic by which the leaky bucket is refilled, this time delay is directly determined by the difference between the downgrading threshold and the upgrading threshold, and the leakage rate of the leaky bucket.

Embodiments of the present invention provide a number of advantages of which one is that they provide a possibility to determine a trade-off between the need to optimize response times for short-lived sessions and limiting the impact on other users when prioritizing long lived high volume sessions.

Another advantage is that the embodiments are applicable to situations in which a direct classification, using IP 5-tuple or deep packet inspection is not meaningful.

It may be further noted that the above described embodiments are only given as examples and should not be limiting to the present invention, since other solutions, uses, objectives, and functions are apparent within the scope of the invention as claimed in the accompanying patent claims.

ABBREVIATIONS

AS—application server
BS—base station
DG—downgrade
IP—Internet protocol
NW—network
PGW—packet gateway
QoS—quality of service
TH—threshold
UG—upgrade

The invention claimed is:

1. A method for updating a prioritization level of a service data flow between a user node and a network node of a communication system, the network node further being connected to an application server participating in the service data flow, the method being performed in an apparatus of the communication system, the apparatus having access to the service data flow, the method comprising:
  obtaining a traffic size per time unit of detected data packets of the service data flow, the traffic size per time unit representing a data volume per time unit;
  updating the prioritization level of the service data flow, based on the obtained traffic size per time unit; and,
  adding virtual tokens to a virtual leaky bucket based on the obtained traffic size per time unit of the service data flow, and withdrawing virtual tokens from the virtual leaky bucket according to a leakage rate of the virtual leaky bucket;
  wherein updating the prioritization level of the service data flow comprises:
    downgrading the prioritization level if a fill level of virtual tokens in the virtual leaky bucket increases to a first downgrade threshold; and,
    upgrading the prioritization level, if the fill level of virtual tokens in the virtual leaky bucket decreases to a pending threshold and no data packets have been detected during a pre-determined time interval, or if the fill level of virtual tokens in the virtual leaky bucket decreases to a first upgrade threshold.

2. The method according to claim 1, wherein updating the prioritization level of the service data flow further comprises upgrading the prioritization level from an already upgraded prioritization level, if the fill level of virtual tokens in the virtual leaky bucket decreases to a second upgrade threshold.

3. The method according to claim 1, wherein updating the prioritization level of the service data flow further comprises downgrading the prioritization level from an already downgraded prioritization level, if the fill level of virtual tokens in the virtual leaky bucket increases to a second downgrade threshold.

4. The method according to claim 1, further comprising determining a quality of service, QoS, for the service data flow, wherein the QoS corresponds to the updated prioritization level.

5. The method according to claim 4, further comprising sending a request for the determined QoS to a policy node, for enabling the network node to allocate a bearer for the service data flow, the bearer being associated with the determined QoS requested.

6. The method according to claim 4, further comprising signaling a QoS update to a base station serving the user node, for enabling the base station to allocate a bearer for the service data flow, the bearer being associated with the determined QoS requested.

7. The method according to claim 4, further comprising allocating a bearer for the service data flow, the bearer being associated with the determined QoS requested.

8. The method according to claim 7, wherein allocating a bearer for the service data flow comprises updating an already existing bearer to correspond to the determined QoS for the service data flow or by allocating a dedicated bearer associated with the determined QoS.

9. The method according to claim 1, further comprising scheduling transmission of data of the service data flow, according to the updated prioritization level.

10. The method according to claim 1, wherein obtaining the traffic size per time unit comprises measuring a size of data packets of the service data flow per time unit.

11. An apparatus for updating a prioritization level of a service data flow between a user node and a network node of a communication system, where the apparatus is configured to have access to the service data flow, and comprises:
  a processor; and,
  a memory storing a computer program comprising computer program code which, when run in the processor, causes the apparatus to:
    obtain a traffic size per time unit of the service data flow, the traffic size per time unit representing a data volume per time unit;
    update the prioritization level of the service data flow based on the obtained traffic size per time unit;
    obtain a fill level of virtual tokens in a virtual leaky bucket;
    add virtual tokens to the virtual leaky bucket based on the obtained traffic size per time unit of the data traffic flow, and withdraw virtual tokens from the virtual leaky bucket according to a leakage rate of the virtual leaky bucket;
    downgrade the prioritization level if the fill level of virtual tokens in the virtual leaky bucket increases to a first downgrade threshold; and,
    upgrade the prioritization level, if the fill level of virtual tokens in the virtual leaky bucket decreases to a pending threshold and no data packets have been detected during a pre-determined time interval, or if the fill level of virtual tokens in the virtual leaky bucket decreases to a first upgrade threshold.

12. The apparatus according to claim 10, wherein the computer program code which, when run in the processor, further causes the apparatus to further upgrade the prioritization level from an already upgraded prioritization level, if the fill level of virtual tokens in the virtual leaky bucket decreases to a second upgrade threshold.

13. The apparatus according to claim 10, wherein the computer program code which, when run in the processor, further causes the apparatus to further downgrade the prioritization level from an already downgraded prioritization level, if the fill level of virtual tokens in the virtual leaky bucket increases to a second downgrade threshold.

14. The apparatus according to claim 10, wherein the apparatus is comprised within a packet inspection node, the network node for the service data flow, a base station or a radio network controller, serving the user node.

15. A non-transitory computer readable medium containing a computer program for updating a prioritization level of a service data flow between a user node and a network node of a communication system, the computer program comprising computer program code which, when run in a processor of an apparatus having access to the service data flow, causes the apparatus to:
  obtain a traffic size per time unit of the service data flow, the traffic size per time unit representing a data volume per time unit;
  update the prioritization level of the service data flow based on the obtained traffic size per time unit; and,
  add virtual tokens to a virtual leaky bucket based on the obtained traffic size per time unit of the service data flow, and withdrawing virtual tokens from the virtual leaky bucket according to a leakage rate of the virtual leaky bucket;
  wherein updating the prioritization level of the service data flow comprises:
    downgrading the prioritization level if a fill level of virtual tokens in the virtual leaky bucket increases to a first downgrade threshold; and,
    upgrading the prioritization level, if the fill level of virtual tokens in the virtual leaky bucket decreases to a pending threshold and no data packets have been detected during a pre-determined time interval, or if the fill level of virtual tokens in the virtual leaky bucket decreases to a first upgrade threshold.

* * * * *